US006530279B1

(12) United States Patent
Weinmann, Jr.

(10) Patent No.: US 6,530,279 B1
(45) Date of Patent: Mar. 11, 2003

(54) FIXTURE FOR HOLDING ELECTRONIC COMPONENTS FOR VIBRATION TESTING

(75) Inventor: Robert H. Weinmann, Jr., Laguna Hills, CA (US)

(73) Assignee: Screening Systems, Inc., Aliso Viejo, CA (US)

(*) Notice: Subject to any disclaimer, the term of this patent is extended or adjusted under 35 U.S.C. 154(b) by 0 days.

(21) Appl. No.: 09/683,978

(22) Filed: Mar. 7, 2002

(51) Int. Cl.[7] .............................................. G01M 7/02
(52) U.S. Cl. ...................................................... 73/663
(58) Field of Search .......................... 73/662, 663, 664, 73/866.5, 865.9

(56) References Cited

U.S. PATENT DOCUMENTS

| 4,518,210 A | * | 5/1985 | Morrisson ................. 339/17 M |
| 4,603,587 A | * | 8/1986 | Kimball et al. ................ 73/665 |
| 4,959,609 A | * | 9/1990 | Prokopp et al. ......... 324/158 F |
| 5,766,023 A | * | 6/1998 | Noschese et al. .............. 439/74 |
| 6,040,703 A | * | 3/2000 | Kimball ....................... 324/755 |

FOREIGN PATENT DOCUMENTS

DE  257027  * 6/1988

* cited by examiner

Primary Examiner—Hezron Williams
Assistant Examiner—Nashmiya Fayyaz
(74) Attorney, Agent, or Firm—Blakely, Sokoloff, Taylor & Zafman LLP

(57) ABSTRACT

A first circuit board includes a first plurality of holes to receive an electronic module and to provide an electrical circuit environment to test the electronic module. A second circuit board includes a second plurality of holes cooperatively arranged with the first plurality of holes. The second circuit board is slidably coupled to the first circuit board and slides between an insertion position in which the first and second pluralities of holes are aligned to receive the electronic module and a holding position in which the first and second pluralities of holes are offset to hold the electronic module. A biasing member urges the second circuit board toward the holding position.

18 Claims, 4 Drawing Sheets

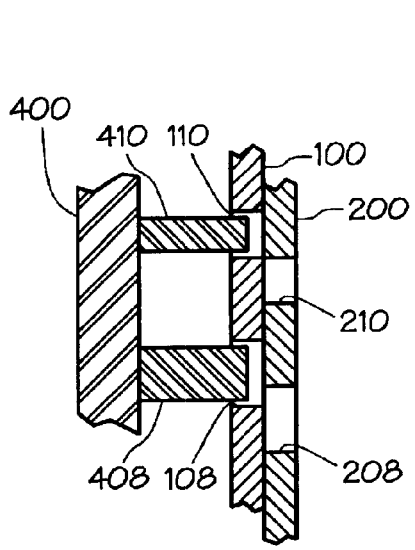
FIG. 4A
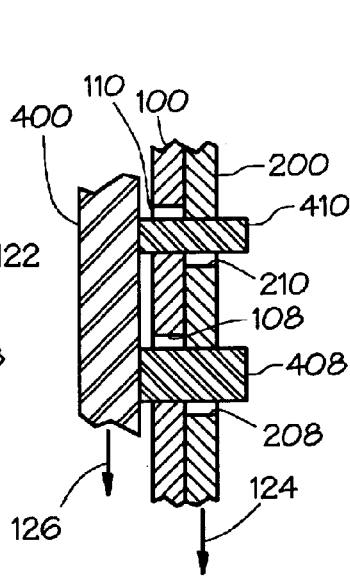
FIG. 4B
FIG. 4C
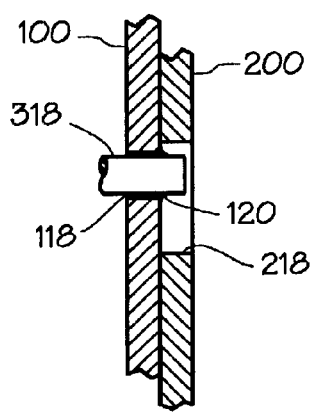
FIG. 5
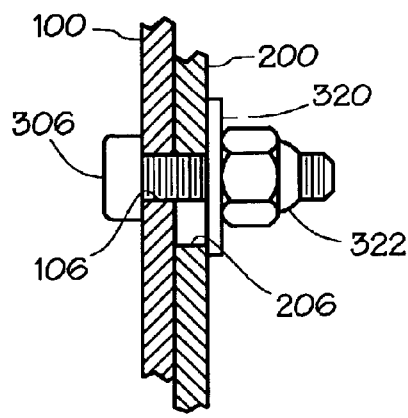
FIG. 6

FIXTURE FOR HOLDING ELECTRONIC COMPONENTS FOR VIBRATION TESTING

BACKGROUND OF INVENTION

Electronic assemblies are sometimes provided in the form of electronic modules. Modules incorporate a number of electronic components which are interconnected and provided with pins in an enclosed body. Typical electronic modules range from 1.6 inches square to 2.4×3.45 inches in outline dimension. Typically they are 0.5 inches thick. The pins typically extend outwardly from the bottom surface. Typical pins are 0.025 inches square, 0.040 inches round, or 0.080 inches round with lengths from 0.123 inches to 0.210 inches. A single module may use pins of more than one cross section. For example, a module might use 0.040 inch round pins for signals and 0.080 inch round pins for power. There is a wide variety of pin patterns used in the modules to accommodate the great variety of circuits that may be provided as modules and the internal layout of the components making up the module.

For certain applications it is desirable to perform vibration testing of the modules before they are placed into service. This requires that the module be mounted into a test fixture to hold the module as it is vibrated and also to provide electrical connections to the module so that the operation of the module can be monitored during the vibration test. It would be desirable to have a test fixture that would allow the module to be quickly and easily inserted into the test fixture and easily removed from the test fixture after testing is complete. It is undesirable to hand solder test wires to the wire pins and later de-solder and clean the pins because the module will later be used within a manufactured end product. Further, the modules are normally mounted on a larger circuit board with their pins soldered to the board for both physical support and electrical connection. The mechanical and electrical integrity of the pins is of prime importance and is one of the main reasons that a vibration test is performed on the modules. It would be desirable to provide a mounting fixture for a vibration table that clamps a module by the wire pins thus providing both physical mounting similar to the intended end use and electrical connections without the need to solder to the wire pins.

Typical sockets made for easy insertion and removal of electronic components are generally unsuitable for use in holding components during vibration testing. Typical sockets use spring-type connectors which may resonate and provide intermittent connections to the module under test. Further, sockets are not readily available for the pin patterns of most modules. Accordingly, there is a need for a vibration test fixture that can be readily and inexpensively manufactured to accept a module for testing.

SUMMARY OF INVENTION

A first circuit board includes a first plurality of holes to receive an electronic module and to provide an electrical circuit environment to test the electronic module. A second circuit board includes a second plurality of holes cooperatively arranged with the first plurality of holes. The second circuit board is slidably coupled to the first circuit board and slides between an insertion position in which the first and second pluralities of holes are aligned to receive the electronic module and a holding position in which the first and second pluralities of holes are offset to hold the electronic module. A biasing member urges the second circuit board toward the holding position.

BRIEF DESCRIPTION OF DRAWINGS

FIGS. 4A through 4C are sectional views illustrating how a module is inserted into the test fixture.

FIG. 5 is a sectional view taken along line 5—5 of FIG. 1.

FIG. 6 is a sectional view taken along line 6—6 of FIG. 1.

DETAILED DESCRIPTION

Figure 1:
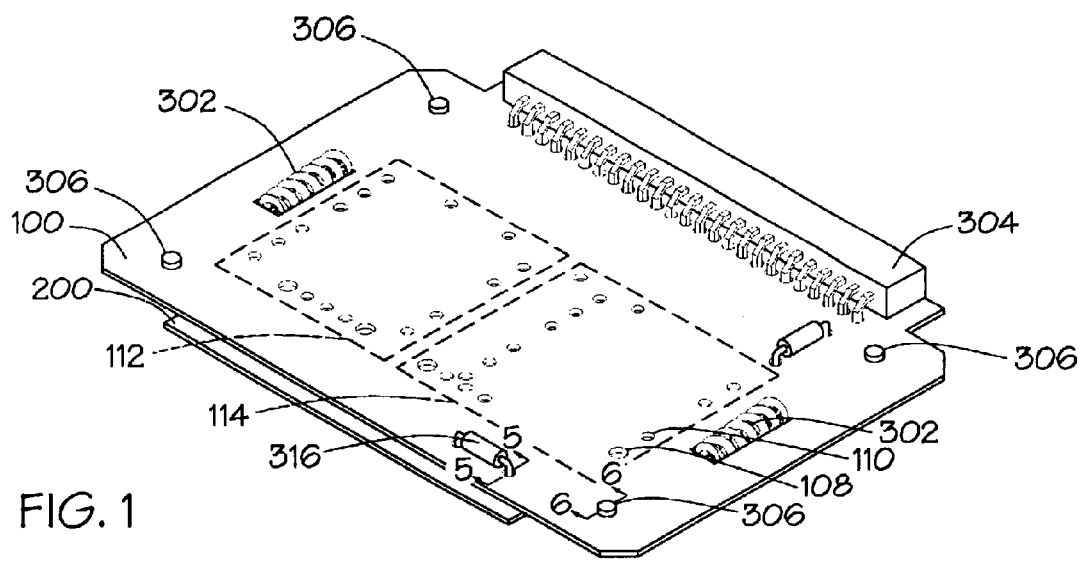
FIG. 1 is an embodiment of a test fixture according to the present invention.

FIG. 1 illustrates an embodiment of a test fixture according to the present invention. The test fixture is made of two circuit boards, an upper board 100 and lower board 200. The two circuit boards may be of any of the many types of printed circuit boards that are well known in the art. The two circuit boards are coupled together by fasteners 306 so that the lower circuit board 200 is slideable relative to upper circuit board 100. Springs 302 are provided to provide a force between the upper board 100 and the lower board 200 to urge the lower board 200 to an initial resting position relative to the upper board 100. While the term "circuit board" is used in describing the lower board of the present invention, the lower board may or may not have metallization and, if there is metal on the lower board, the metal may or may not form an electrical circuit.

The upper board 100 provides an electrical circuit environment for an electronic module under test. A circuit connector 304 may be provided on the upper board for the purpose of making electrical connections to the test fixture. A plurality of holes 108, 110 are provided in the upper circuit board 100 to receive and electrically connect the pins of the module under test. For smaller electronic modules it may be possible to provide a test fixture that can receive two modules simultaneously for testing as indicated by the two module outlines 112, 114 on the upper board 100.

The upper circuit board 100 will typically contain interconnecting circuit traces and electrical components 316 to provide an operating environment for the modules to be tested and connections to and from the pins of the module to a circuit connector 304. The plurality of holes 108, 110 are through plated to provide an electrical contact for the pins of the module under test. The construction of a circuit board to provide an electrical environment for testing of the modules can be by any means well known in the circuit board art.

Figure 2:
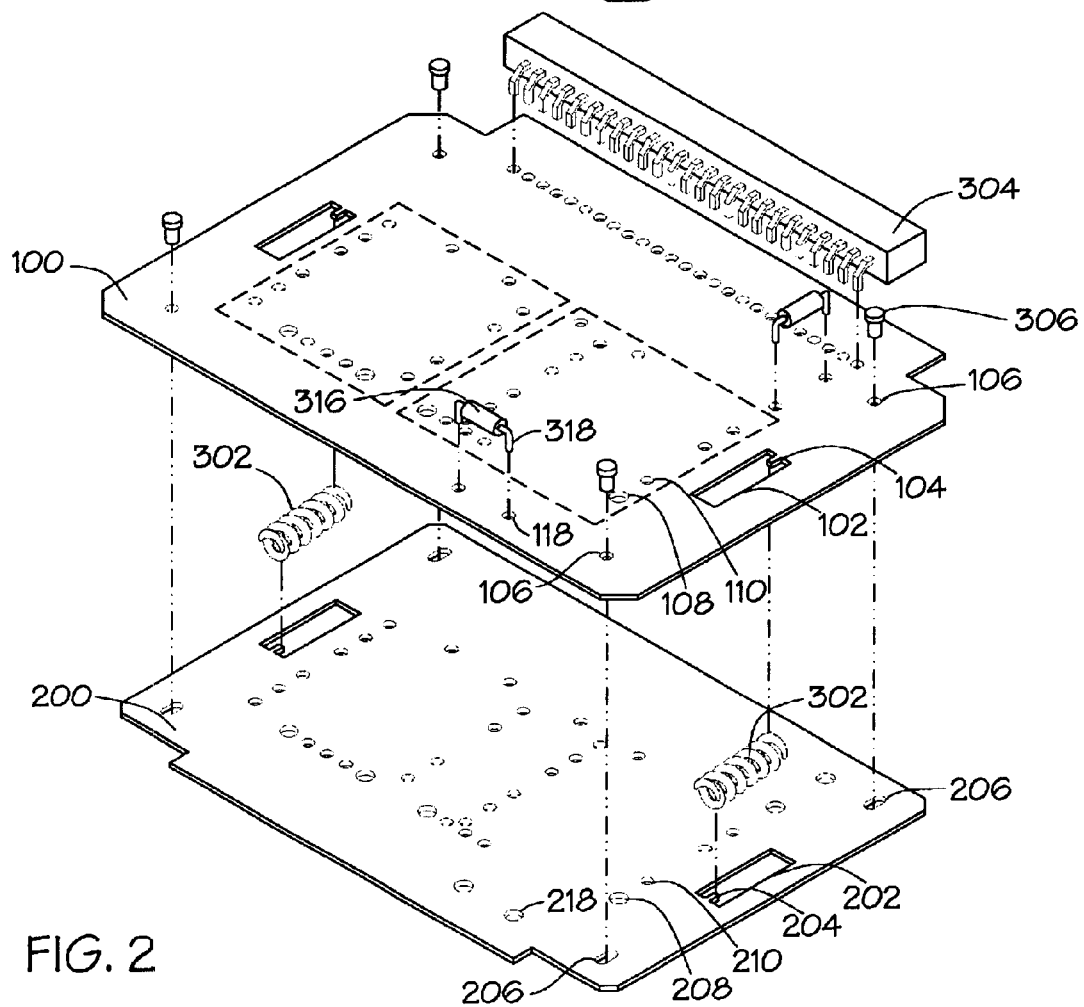
FIG. 2 is an exploded view of the test fixture illustrated in FIG. 1.

FIG. 2 is an exploded view of the test fixture illustrated in FIG. 1. The upper circuit board 100 and the lower board 200 are joined by fasteners 306 which extend through a closely fitting hole 106 in one of the two boards and a loosely fitting hole 206 in the other board. In the embodiment illustrated in the figures there is a closely fitting hole 106 in the upper board and a slot 206 in the lower board 200. The fastening arrangement is such that the lower board can slide a certain distance relative to the upper circuit board 100.

In the embodiment illustrated, coil springs 302 are fitted in openings in the upper board 102 and lower board 202 and held captive on upper board projections 104 and lower board projections 204 so that the spring presses the lower board 200 away from the upper board 100 to the extent permitted by the sliding coupling of the fasteners 306. Preferably, the coil spring is arranged so that it is under compression and providing force even when the board 200 is moved by the springs 302 to the maximum extent permitted by the sliding coupling provided by the fasteners 306 to a resting position.

Figure 3A:
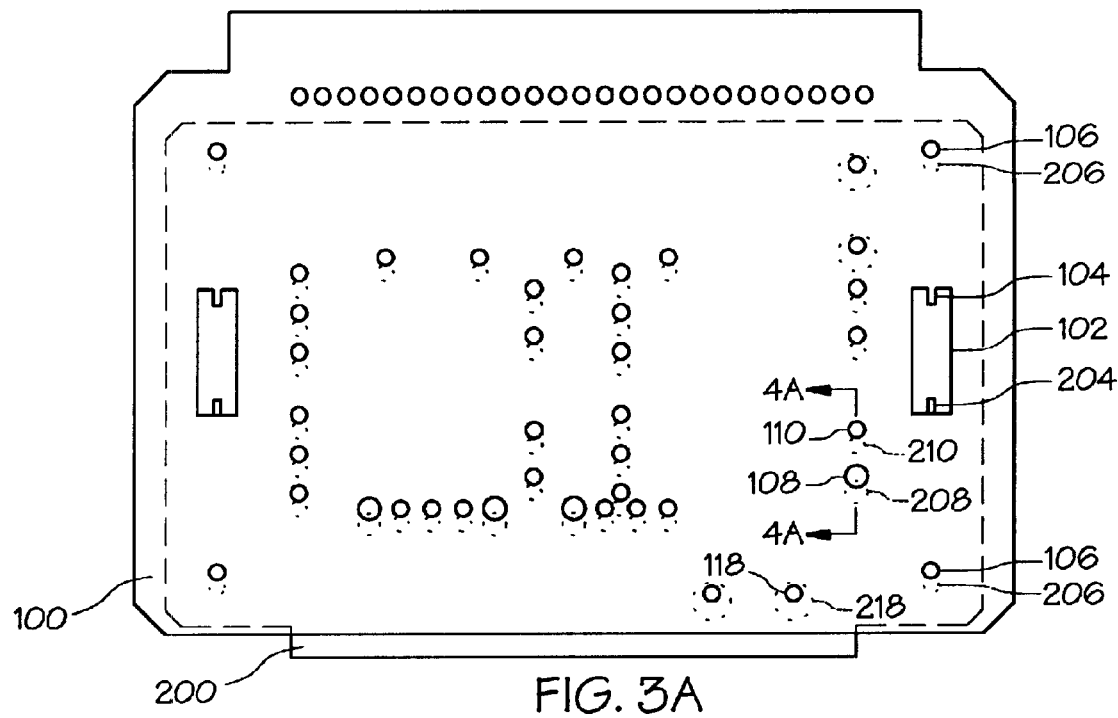
FIG. 3A is a plan view of the upper lower boards of the test fixture.

FIG. 3A is a plan view of the upper board 100 and the lower board 200 of the test fixture. FIG. 3A illustrates the two boards with the lower board 200 in the resting position. As may be seen, the holes in the upper board 108, 110 are occluded, either partially or completely, by the lower board 200.

Figure 3B:
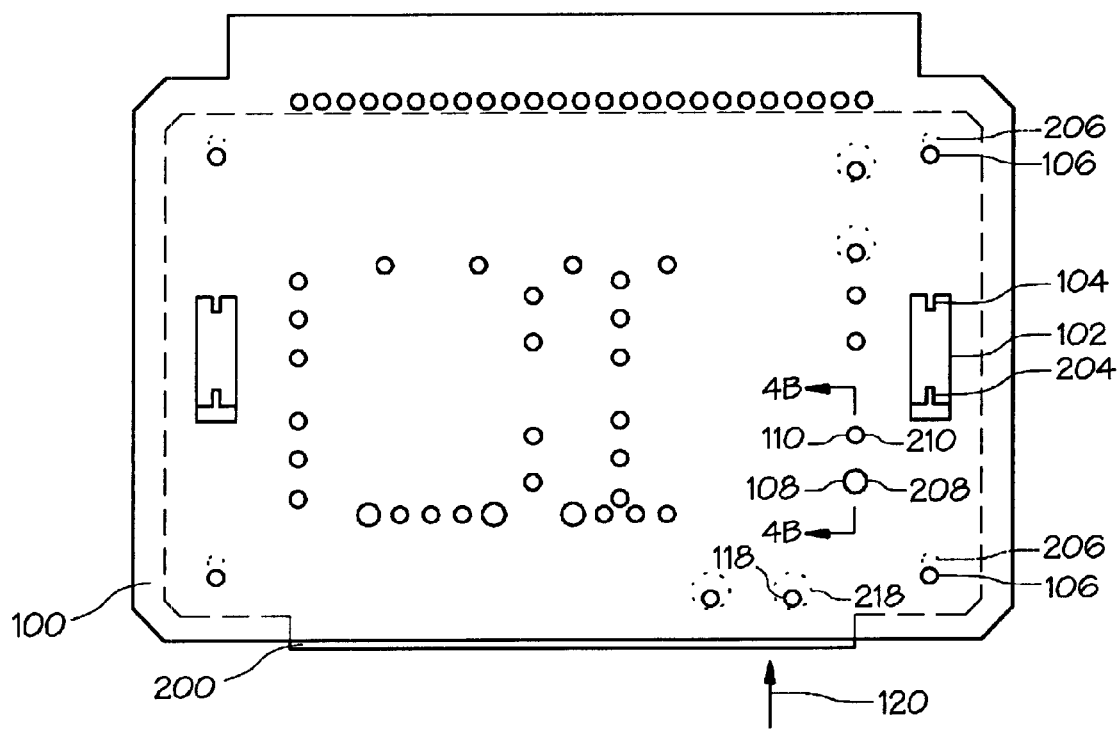
FIG. 3B is a plan view of the upper lower boards in an insertion position.

FIG. 3B is a second plan view of the upper board 100 and the lower board 200 of the test fixture. FIG. 3B illustrates the two boards with the lower board 200 moved in the direction indicated by the arrow 120 against the compressive force of the springs 302 to an insertion position. In the insertion position, holes 108, 110 in the upper board 100 are substantially aligned with corresponding holes 208, 210 in the lower board 200. Preferably, the insertion position corresponds substantially to the maximum extent of compression against the spring force permitted by the sliding coupling of the fasteners 306 in the loosely fitting hole 206.

FIGS. 4A through 4C are sectional views through a portion of the boards 100, 200 along a diameter of the holes 108, 110, 208, 210 illustrating how a module 400 is inserted into the test fixture.

FIG. 4A is a section view taken along the line 4A—4A in FIG. 3A. The lower board 200 is in the resting position. The smaller of the two holes 110 on the upper board 100 is completely occluded by the lower board 200. The larger hole 108 is partially occluded. The corresponding pins 408, 410 of an electronic module 400 can be inserted into the holes 108, 110 of the upper board 100 but they are blocked by the lower board 200.

FIG. 4B is a section view taken along the line 4B—4B in FIG. 3B. The lower board 200 has been moved in the direction indicated by the arrow 120 to the insertion position. The holes 108, 110 of the upper board 100 are now substantially in alignment with the corresponding holes 208, 210 of the lower board 200. The pins 408, 410 of the electronic module can now be inserted through both boards 100, 200 in the direction indicated by the second arrow 122. The combined thickness of the two boards 100, 200 is preferably less than the length of the pins 408, 410 on the electronic module 400.

FIG. 4C is a section view showing the test fixture in a holding position with the electronic module 400 installed. The lower board 200 has been released from the insertion position shown in FIG. 4B and it has moved in the direction indicated by the arrow 124. The movement of the lower board 200 urges the pins of the electronic module and thus the electronic module in the direction indicated by the second arrow 126. The fit of the pins 408, 410 prevents the lower board 200 from returning to the resting position shown in FIG. 4A. In the holding position, the springs 302 provide a clamping force to hold the electronic module 400 in the test fixture during vibration testing. The clamping force also forces the pins 408, 410 into electrical contact with holes 108, 110 of the upper board 100.

It may be appreciated that the clearance between the pins 408, 410 and the holes 108, 110, 208, 210 has been exaggerated for clarity in the Figures. The clearance should be no larger than necessary for easy insertion of the pins 408, 410 to minimize bending of the pins when held by the test fixture. Where pins of more than one size are provided by the module the location of the holes 208, 210 on the lower board 200 may be offset relative to the corresponding holes 108, 110 on the upper board 100 to achieve the desired clamping of the pins 408, 410 in the holding position. The lower holes 208, 210 may be through plated to improve the mechanical durability of the holes even though the plating is not electrically required.

The springs 302 should be chosen to provide a sufficient clamping force to reliably hold the electronic module during vibration testing. Factors considered in selecting springs may include the mass of the module, the number and type of pins on the module, and the magnitude and frequency of vibrational forces to be applied.

As shown in FIG. 5, a sectional view taken along line 5—5 of FIG. 1, components 316 that are installed into the upper board 100 to provide the electrical environment for the module under test, may have lead ends 318 and solder fillets 120 that extend from holes 118 into which the components 316 are soldered. The lower board 200 may be provided with relief holes 218 that are large enough and located to provide clearance for the lead ends 318 and solder fillets 120 in the range of positions for the lower board 200 permitted by the sliding connection 306 such that the movement of the lower board is not constrained by the lead ends 318.

FIG. 6 is a sectional view taken along line 6—6 of FIG. 1 showing an exemplary assembly of the slidable connection between the boards 100, 200. In the embodiment shown, a screw 306 passes through a closely fitted hole 106 in the upper board 100 and a loosely fitting hole 206 in the lower board 200. A nut 322 and washer 320 are assembled to the screw 306 to hold the two boards 100, 200 closely together but with sufficient clearance to allow sliding motion between the boards. The nut 322 may be a locking nut that can be tightened as required to provide the desired clearance and resist the effects of vibration. It will be appreciated that various mechanical assemblies are possible to provide the desired sliding connection between the boards. For example the closely fitting hole could be placed in the lower board 200 and the loosely fitting hole could be in the upper board 100. Both holes may be loosely fitting in an alternate embodiment. The loosely fitting hole could be a round hole or a shaped hole that permits the fastener to move as required to place the two boards 100, 200 into the insertion position illustrated by the exemplary embodiment of FIG. 3B. The fastener could be a rivet with a spring washer to provide a slidable connection.

Figure 7:
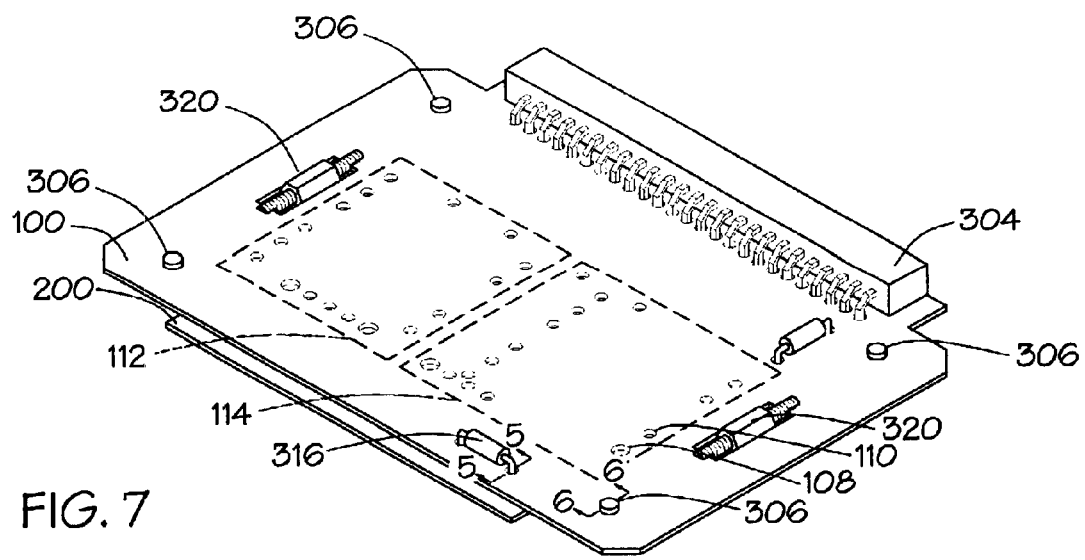
FIG. 7 is another embodiment of a test fixture according to the present invention.
Figure 8:
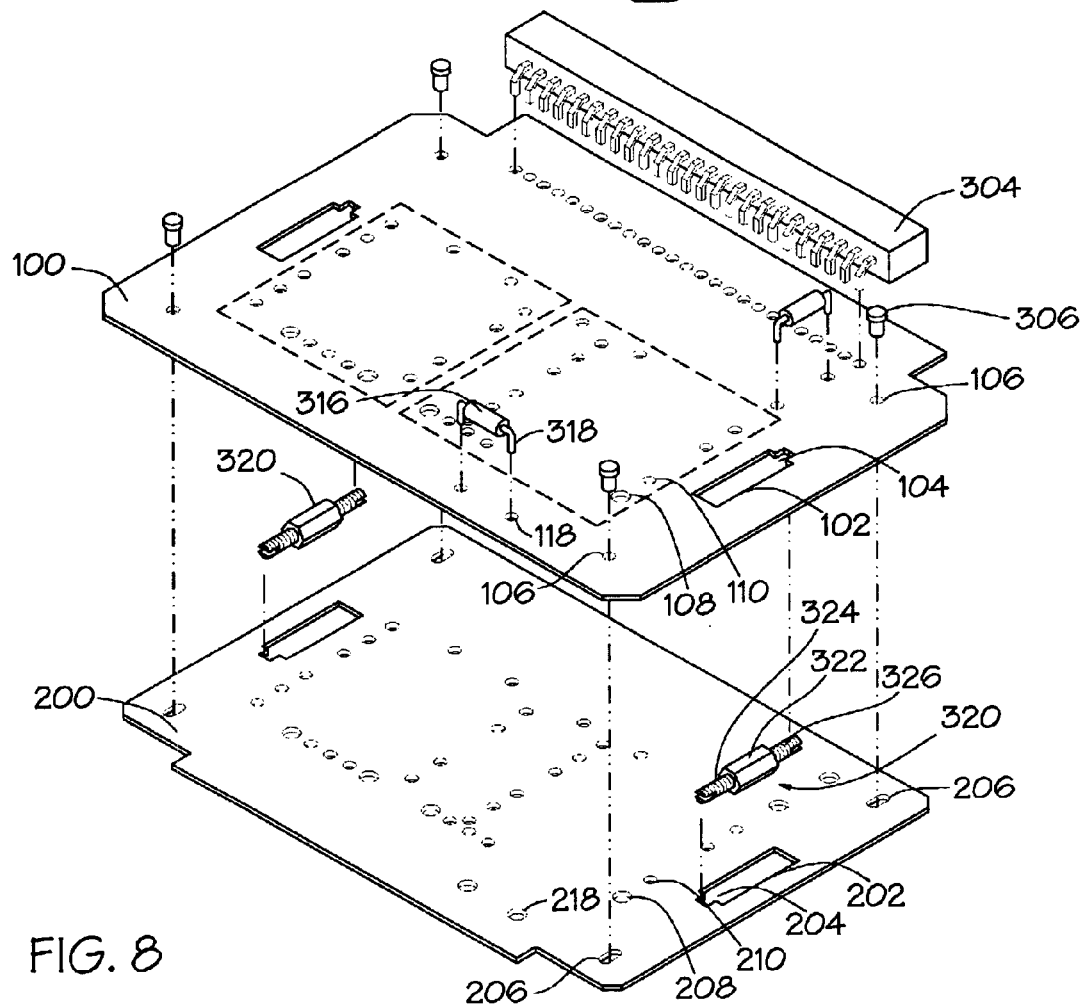
FIG. 8 is an exploded view of the test fixture illustrated in FIG. 7.

FIGS. 7 and 8 illustrate another embodiment of the invention where a positive mechanical device, such as a turnbuckle 320, may provide the clamping force when the fixture is in the holding position. The turnbuckle 320 may include two oppositely threaded extensions 324, 326 joined by a cooperatively threaded part 322. The threaded part 322 may be rotated to expand or contract the turnbuckle assembly 320 to adjust the clamping force. The threads of the turnbuckle 320 may include nylon locking material to prevent the turnbuckle from loosening from vibration during testing. Other types of mechanical assemblies such as cam mechanisms or overcenter mechanisms may be used as the positive mechanical device. The expansion of the positive mechanical device acts on the first circuit board 100 and the second circuit board 200 to move the two boards in opposite directions toward the holding position.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A fixture for holding an electronic module for vibration testing comprising:
   a first circuit board having a first plurality of holes to receive the electronic module and to provide an electrical circuit environment to test the electronic module while being vibrated;
   a second circuit board having a second plurality of holes cooperatively arranged with the first plurality of holes, the second circuit board slidably coupled to the first circuit board, the second circuit board slidable between an insertion position in which the first and second pluralities of holes are aligned to receive the electronic module and a holding position in which the first and second pluralities of holes are offset to hold the electronic module; and
   a biasing member that urges the second circuit board toward the holding position to hold the electronic module during vibration testing.

2. The fixture of claim 1, further comprising a plurality of fasteners slidably coupling the second circuit board to the first circuit board.

3. The fixture of claim 2, wherein each fastener passes through a closely fitting hole in one of the two circuit boards and a loosely fitting hole in the other circuit board.

4. The fixture of claim 3, wherein the loosely fitting hole is a slot that allows the two circuit boards to slide relative to each other in a first direction and constrains movement of the two circuit boards in a second direction perpendicular to the first direction.

5. The fixture of claim 1, wherein the biasing member is a coil spring.

6. The fixture of claim 5, wherein the coil spring is fitted in a first opening in the upper board and a second opening in the lower board and held captive by a first projection in the first opening and an opposing second projection in the second opening.

7. The fixture of claim 1, wherein the biasing member is a turnbuckle.

8. The fixture of claim 1, wherein the first circuit board includes electrical components having leads soldered to the first circuit board and the second circuit board includes clearance holes that receive lead end portions of the leads, the clearance holes being sized and positioned such that the movement of the second board is not constrained by the lead end portions.

9. A fixture for holding an electronic module for vibration testing comprising:
   a first means for receiving the electronic module and providing an electrical circuit environment for testing the electronic module while being vibrated;
   a second means for holding the electronic module in the first means, the second means slidably coupled to the first means, the second means slidable between an insertion position to receive the electronic module and a holding position to hold the electronic module; and
   a biasing means for urging the second means toward the holding position to hold the electronic module during vibration testing.

10. The fixture of claim 9, further comprising a plurality of fastening means for slidably coupling the second means to the first means.

11. The fixture of claim 9, wherein the biasing means is a coil spring.

12. The fixture of claim 11, wherein the coil spring is fitted in a first opening in the first means and a second opening in the second means and held captive by a first projection in the first opening and an opposing second projection in the second opening.

13. The fixture of claim 9, wherein the biasing means is a turnbuckle.

14. The fixture of claim 9, wherein the first means includes electrical components having leads soldered to the first means and the second means includes clearance means for receiving lead end portions of the leads and preventing the lead end portions from constraining movement of the second means.

15. A method for vibration testing an electronic module comprising:
   placing the electronic module in a first plurality of holes in a first circuit board to provide an electrical circuit environment to test the electronic module while being vibrated;
   biasing a second plurality of holes in a second circuit board toward a holding position, the second circuit board being slidably coupled to the first circuit board, the second plurality of holes cooperatively arranged with the first plurality of holes such that the first and second pluralities of holes are offset to hold the electronic module when biased toward the holding position, the biasing being such that the electronic module is held during vibration testing.

16. The method of claim 15, wherein placing the electronic module in the first plurality of holes further includes aligning the second plurality of holes with the first plurality of holes.

17. The method of claim 15, wherein biasing further includes expanding a positive mechanical device that acts to move the first circuit board and the second circuit board in opposite directions.

18. The method of claim 15, wherein biasing further includes expanding a turnbuckle that acts to move the first circuit board and the second circuit board in opposite directions.

* * * * *